United States Patent [19]

Havard et al.

[11] Patent Number: 5,483,034
[45] Date of Patent: Jan. 9, 1996

[54] LASER WELDING PROCESS FOR AN ASSEMBLY OF TWO METAL PARTS

[75] Inventors: Jacques G. W. R. Havard, Moissy-Cramayel; Michel R. Jouardet, Guigneville; Jean-Yves M. Loreau, Thiais; Gérard L. Zanolin, Oncy Sur Ecole, all of France

[73] Assignee: Societe Nationale d'Etude et de Construction de Moteurs d'Aviation "SNECMA", Paris, France

[21] Appl. No.: 248,180

[22] Filed: May 24, 1994

[30] Foreign Application Priority Data

May 25, 1993 [FR] France .................. 93 06208

[51] Int. Cl.$^6$ ................................. B23K 26/00
[52] U.S. Cl. ................................. 219/121.64
[58] Field of Search ............ 219/121.63, 121.64, 219/121.85

[56] References Cited

U.S. PATENT DOCUMENTS

| | | |
|---|---|---|
| 3,695,778 | 10/1972 | Taylor . |
| 4,644,126 | 2/1987 | Schumacher .................. 219/121 ED |
| 4,868,365 | 9/1989 | Farone et al. .................. 219/121.64 |

FOREIGN PATENT DOCUMENTS

| | | |
|---|---|---|
| 0445633 | 9/1991 | European Pat. Off. . |
| 62-127188 | 6/1987 | Japan .................. 219/121.64 |

Primary Examiner—Teresa J. Walberg
Assistant Examiner—J. Pelham
Attorney, Agent, or Firm—Oblon, Spivak, McClelland, Maier, & Neustadt

[57] ABSTRACT

The process makes it possible to produce partitioned boxes by carrying out the fastening or fixture from the outside of said boxes.

Use is made of two successive inclined laser beam shots or flashes (8A,8B), which intersect at the upper surface (1B) of the part (1) constituting the assembly head. The two laser welding axes (8A,8B) intersect two upper corners (2C) of the part (2) serving as the base of the T. The welding device is positioned outside the box, i.e. on the side of the upper surface (1B) of the head (1) of the T.

Application to the manufacture of the arms of the outer duct of a turbojet engine.

4 Claims, 2 Drawing Sheets

LASER WELDING PROCESS FOR AN ASSEMBLY OF TWO METAL PARTS

DESCRIPTION

1. Field of the Invention

The invention relates to the final fixing of an assembly of two T-shaped metal parts, accessible solely from one outer side. It makes it possible to assemble a closed, partitioned box of limited thickness, such as a link arm placed in the cold flow or outer duct downstream of the fan in a turbojet engine.

2. Prior art and set problem

The function of such arms is to stiffen the turbojet engine structure, particularly by creating a link between two annular, coaxial envelopes and optionally straighten or deflect the cold air flow circulating in the outer duct. These arms are metal vanes preferably constituted by a hollow box within which are placed stiffening elements. Such boxes are difficult to manufacture and require numerous operations, particularly for the manufacture of the primary parts, the assembly and the fixture for bringing the box to the given dimensions.

With reference to FIG. 1, the part to be obtained is consequently a type of hollow panel constituted by two relatively thin sheets or plates 1 and 3, which are kept at predetermined distances from one another by stiffeners 2. The shape of such an arm can vary as a function of its location in the turbojet engine. Its shape is generally dependent on the cold flow deflection or straightening function of such an arm.

Moreover, it is clear that it is impossible to carry out fixing operations for the stiffeners 2 on the plates 1 and 3 from the inside of the box.

The aim of the invention is to obviate these disadvantages by proposing a process for the assembly and fixing of such boxes solely from the outside thereof.

SUMMARY OF THE INVENTION

The main object of the invention is therefore a process for the laser welding of a T assembly of two metal parts, in which the assembly is only accessible from the side of the head of the T by an external surface, the process comprising the following phases:

forming a groove on the lower surface of the head of the T having a width equal to the thickness of the base of the T and a given depth, assembly of the base of the T in the groove, $CO_2$ laser welding of the assembly by the upper surface of the head of the T by two welds inclined with respect to the perpendicular to the upper surface of the head of the T and respective reverse inclinations, so that the two welding axes intersect in the vicinity of the outer upper surface of the T, the directions of the axis of the laser beam preferably being respectively parallel to the planes passing through the point A and the corners formed by the base and the head and a possible variation with respect to said planes being determined as a function of the depth P.

Preferably, the inclination angle of the welding axes is such that each welding axis traverses an upper corner of the base of the T.

In the preferred embodiment of the invention, the parts are made from titanium and aluminium alloy. Preference is given to the use of the alloy TA6V. However, the invention is applicable to numerous materials and more particularly nickel or cobalt-based superalloys used in other parts of turbojet engines.

In the main embodiment of the process according to the invention, the depth of the groove is evolutive between 0.1 and 2 mm along the profile of the head of the T and is a function of the thickness of the base of the T.

In this case, the inclination angle of the welding axes is preferably 15°. The thickness of the head of the T is preferably between 2.5 and 3 mm. This case relates to the application of the process to the manufacture of a cold duct arm of a turbojet engine and the thickness of the base of the T can be 1.5 mm. Welding is preferably continuous over the entire length of the partitions.

LIST OF DRAWINGS

The invention and its various features can be better gathered from the following description relative to the attached drawings, wherein show:

FIG. 1 a box constituting an outer duct arm of a turbojet engine and for which the process according to the invention has been used.

FIG. 2, in section, the assembly by welding according to the invention in a T arrangement.

DETAILED DESCRIPTION OF AN EMBODIMENT

Figure 1:
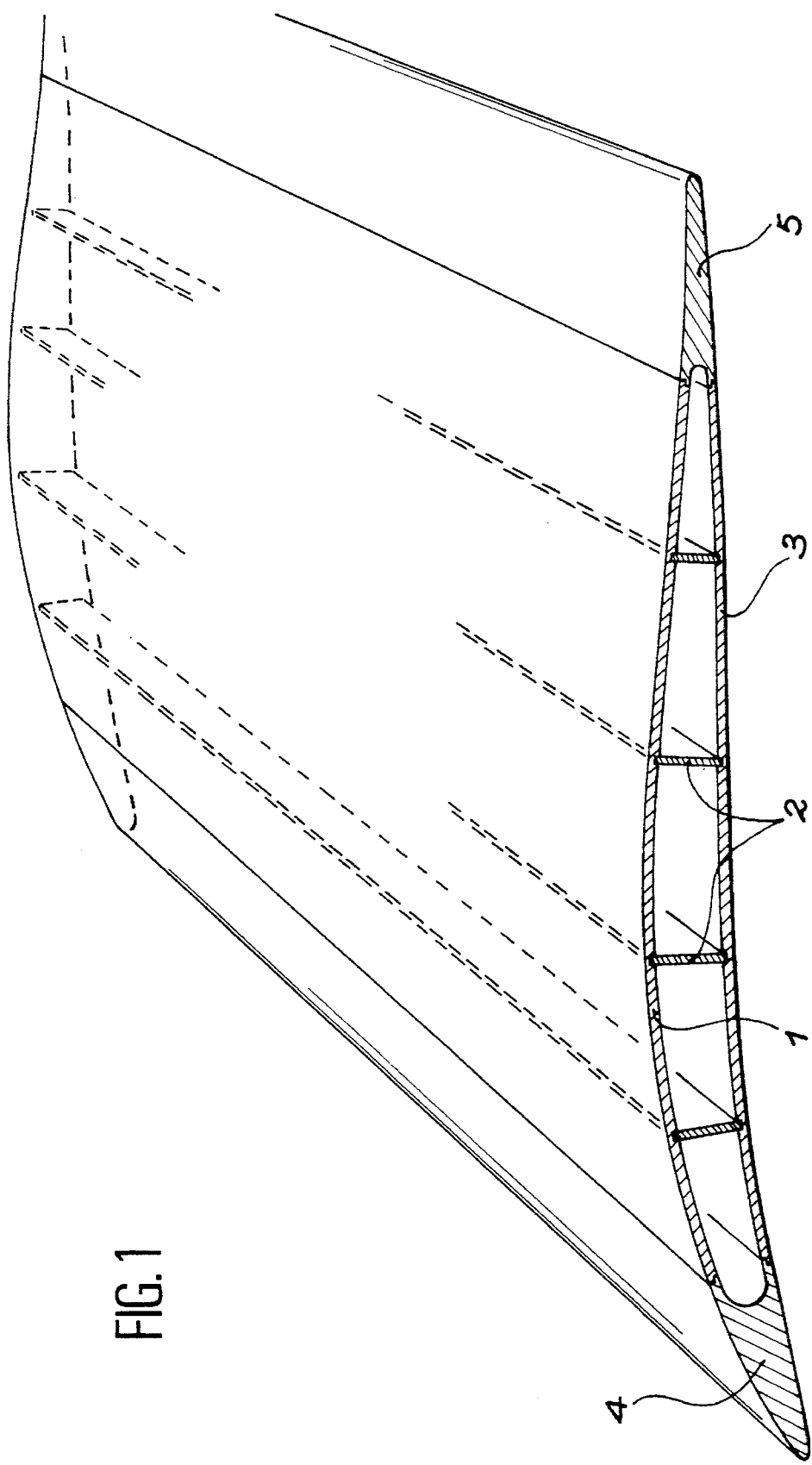

With reference to FIG. 1, the part to which the process according to the invention applies is one of the fixed arms located in the outer duct of a turbojet engine upstream of the thrust reversing means. More specifically, this type of arm has a main function which is that of strengthening the turbojet engine structure. This type of arm can also have an aerodynamic function and serve as a straightener or deflector of the air flow traversing the outer duct. As can be seen, this type of arm is relatively flat, tapered, but profiled in a precise manner. In the case of FIG. 1, the upper or extrados plate 1 has a more convex shape than the lower, intrados plate 3, said two shapes being defined by the aerodynamic function to be fulfilled by the arm with respect to the air flow. These two plates 1 and 3 join at a leading edge 4 and a trailing edge 5 which are both tapered.

The manufacture of such an arm makes it necessary to definitively fix the partitions 2 between these two plates 1 and 3. Obviously such a fixing can only take place from the outside, the interior of the volume defined by the two plates 1 and 3 not being accessible during the fixing operation of the partitions 2.

Figure 2:
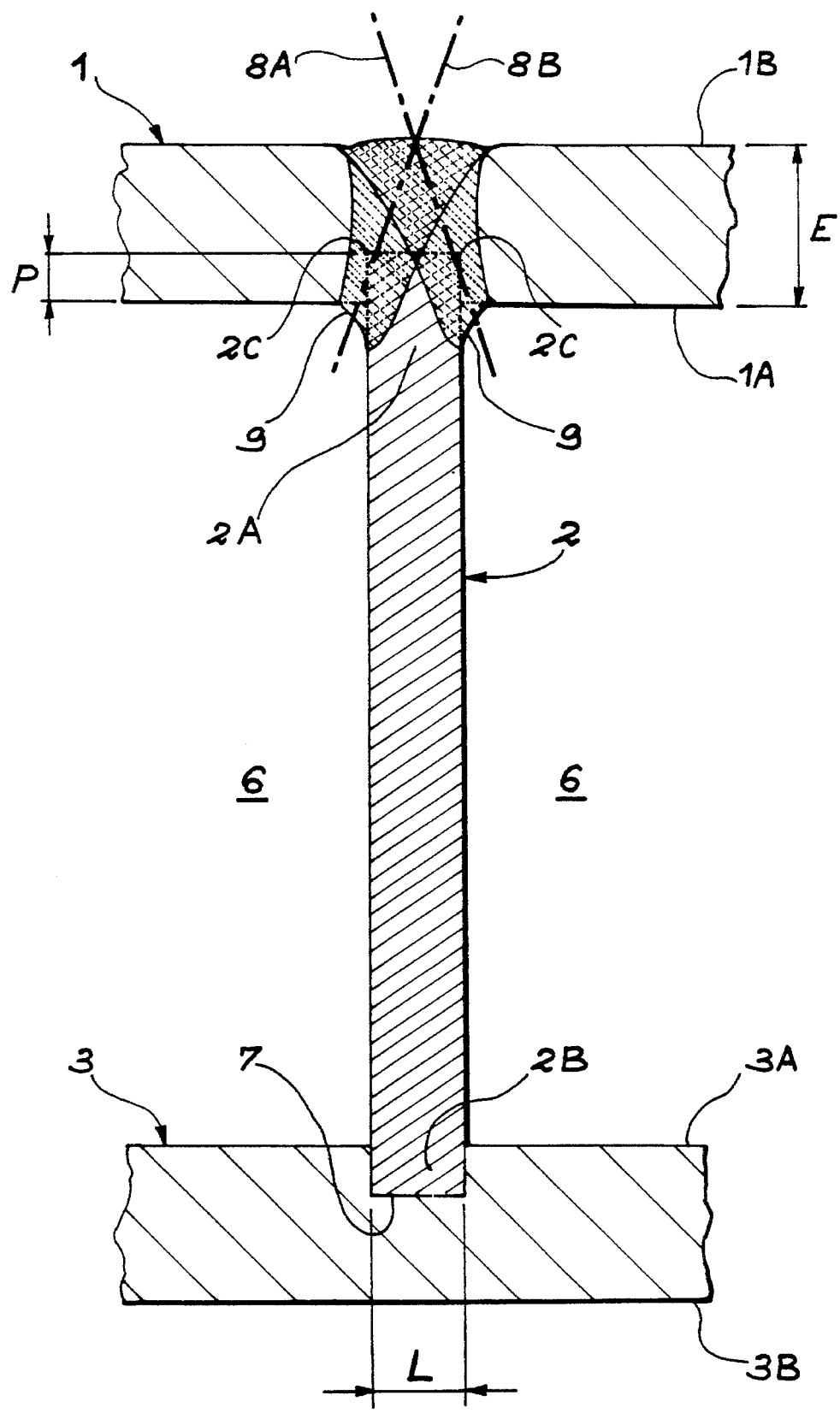

With reference to FIG. 2, it is possible to see the arrangement assembling a partition 2 with an upper extrados plate 1 and a lower intrados plate 3. The upper assembly is shown with a weld, whereas the lower assembly is shown prior to welding. This arrangement is I-shaped and is therefore constituted by two T-shaped assemblies. It is pointed out that the internal volume 6 of the assembled box 1 is inaccessible to an operator or to fixing equipment, such as a welding apparatus.

The invention makes use of $CO_2$ laser welding for assembling each end 2A, 2B of a partition respectively with the upper plate 1 and the lower plate 3.

To do this and as is shown in the bottom of FIG. 2, a groove 7 is machined in each of the inner surfaces 1A and 3A of the extrados plate 1 and intrados plate 3. The width L of said groove 7 corresponds to the thickness of the partition 2, which constitutes the base of each of the two T assemblies. As a function of the variation of the profile of the plates 1 and 3, the depth P of the groove 7 is evolutive along said profile.

Moreover, in the present embodiment, the variation between the plates 1 and 3 of FIG. 1 differs from one end to the other and consequently so does the height of the partitions 2, which consequently has a conical profile.

The second operation consists of assembling the partition 2 in each of the grooves 7 of the plates 1 and 3 in order to form an I, as shown in FIG. 2.

According to the invention, welding takes place according to two axes 8A,8B, which are inclined with respect to one another and intersect at the upper surface 1B of the extrados plate 1. These two axes 8A and 8B consequently form an X, whose centre is placed in the upper part of the extrados plate 1. FIG. 2 shows that these two welding axes 8A,8B traverse the plate 1 and the corners 2C of the partition 2.

As the energy supplied by the $CO_2$ laser is concentrated along the two welding axes 8A,8B, it traverses the plate 1 and the two corners 2C. All the metallic material located in the immediate environment of such a welding axis 8A or 8B is exposed to a local, very significant temperature rise. Thus, the metal melts and there is a mixing of the melted metals from the extrados plate 1 and the partition 2. Thus, as a result of two X-inclined welds, there is an overall welding of the extrados plate 1 to the partition 2.

Several hatched areas represent the temperature rise, which is at a maximum in the upper part of the plate 1 and which continues on either side in the downwards direction towards the corners 2C of the partition 2. By melting a fillet 9 also appears within each of the corners formed by these two parts. The quality of the result obtained due to the invention is conditioned by producing a metallic continuity over the entire length of the partition 2 of the connecting fillet 9 obtained in the corners 2C formed by the parts.

In connection with the manufacture of an outer duct arm for a turbojet engine and in the case of the manufacture of a box shown in FIG. 1, it is possible to better define the dimensional values:

the inclination angle S of the welding axes 8A and 8B is close to 15°, the thickness E of the extrados plate 1 varies between 2.5 and 3 mm, the depth P of the groove 7 is evolutive between 0.1 and 2 mm and the thickness L of the partition is 1.5 mm.

It should be noted that in this type of assembly, the part serving as the base of the T, in the present case the partition 2, must be thinner than the part serving as the head of the T, in the present case the plates 1 and 3.

For other applications and parts having different dimensions, the geometrical parameters of the assembly and the setting of the welding parameters are determined experimentally in each case, whilst retaining the previously defined quality criteria:

obtaining a continuous connecting fillet 9 producing a metallic continuity over the entire length of the partition 2 in the corners 2C formed by the assembled parts, complete melting obtained on the top of the partition 2 at the end of the base of the assembly T3.

Under these conditions, the inclination of the laser welding axes is determined by a direction parallel to the plane passing through the corner 2C formed by the parts 1 and 2 and by a point A, where the median partition plane intersects the outer surface of the plate, a possible variation with respect to said plane being determined as a function of the depth P of the groove 7, whilst still remaining parallel.

In the case of the manufacture of a box to serve as an arm in the case of an outer duct of a turbojet engine, the welding of the partitions 2 to the extrados plate 1 and intrados plate 3 takes place continuously, i.e. the weld is uninterrupted over the entire length of the partitions. The displacement speed of the welding heads can be approximately 2 m/minute. The plates are made from a titanium and aluminium alloy, particularly TA6V. However, the invention is applicable to any weldable metal alloy.

Advantages of the Invention

The use of a $CO_2$ laser makes it possible to limit deformations compared with a plasma assembly process and makes it possible to ensure the formation of a more progressive connecting fillet 9 compared with a fillet obtained by other processes, particularly by an electron beam welding process.

This type of assembly is possible on all metallic materials, no matter what the thickness of the plates, it being obviously indispensable to respect the dimensional proportions of the parts defined hereinbefore.

After welding, the $CO_2$ laser makes it possible to obtain a finished assembly requiring no remachining, particularly at the welds.

This process also makes it possible to weld rectilinear, internal partitions, despite the more or less cambered intrados and extrados profiles. Mechanical protections are not necessary with respect to the $CO_2$ laser beam impact on the plate serving as the base of the T, due to the limited energy of the laser beam following the penetration of the part serving as the head of the T, as a result of the rapid defraction of the beam.

The process according to the invention is applicable to any random partitioned box, whose plates have a limited thickness.

We claim:

1. Process for the laser welding of a T-shaped assembly of two metal parts (1,3 and 2) accessible only from the side of the head of the T by an outer surface (1B, 3B), i.e., inaccessible by the side of the base of the T (2), the process having the following stages:

forming a groove (7) on the lower surface (1A, 3A) of the head of the T (1, 3) with a width (L) equal to the thickness of the base of the T (2) and with a given depth (P), assembly of the base of the T (2) in the groove (7), $CO_2$ laser welding of the assembly by the upper surface (1B, 3B) of the head of the T (1, 3) by two welds inclined with respect to a straight line perpendicular to the outer upper surface (1B, 3B) at a point (A) and having respective reversed inclinations, so that the two welding axes (8A, 8B) intersect in the vicinity of the upper outer surface (1B, 3B) of the head of the T (1, 3), the directions of the welding axes (8A, 8B) are respectively parallel to the lines passing through a point (A) of the outer upper surface (1B, 3B) and the median plane of the T and through the corners formed by the base (2) and the head (1, 3) of the T, the inclination angle (S) of the welding axes (8A, 8B), the thickness (L) of the base of the T (2) and the depth (P) of the groove (7) are such that each welding axis (8A, 8B) traverses an upper corner (2C) of the base of the T (2).

2. Process according to claim 1, characterized in that welding takes place continuously and so as to ensure a complete remelting of the end of the base of the T (2) and the obtaining of a continuous connection fillet (9) in each assembly corner of the head (1,3) and the base (2) of the T.

3. Process according to claim 2, characterized in that the thickness E of the head of the T (1,3) is between 2.5 and 3 mm, the thickness L of the base of the T (2) is 1.5 mm and the depth (P) of the groove (7) is evolutive between 0.1 and 2 mm along the profile.

4. Process according to claim 3, characterized in that the inclination angle (S) of the welding axes (8A,8B) is approximately 15°.

* * * * *